United States Patent
Saha et al.

(10) Patent No.: US 10,678,673 B2
(45) Date of Patent: Jun. 9, 2020

(54) SOFTWARE PROGRAM FAULT LOCALIZATION

(71) Applicant: FUJITSU LIMITED, Kawasaki-shi, Kanagawa (JP)

(72) Inventors: Ripon K. Saha, Santa Clara, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/648,441

(22) Filed: Jul. 12, 2017

(65) Prior Publication Data
US 2019/0018753 A1 Jan. 17, 2019

(51) Int. Cl.
*G06F 11/36* (2006.01)
*G06F 11/07* (2006.01)

(52) U.S. Cl.
CPC ...... *G06F 11/3624* (2013.01); *G06F 11/0703* (2013.01); *G06F 11/36* (2013.01); *G06F 11/362* (2013.01); *G06F 11/3612* (2013.01); *G06F 11/0751* (2013.01); *G06F 11/3636* (2013.01); *G06F 11/3672* (2013.01)

(58) Field of Classification Search
CPC .. G06F 11/0703; G06F 11/0751; G06F 11/36; G06F 11/3612; G06F 11/362; G06F 11/3624; G06F 11/3672; G06F 11/3676; G06F 11/3692
USPC .................................................. 717/124–135
See application file for complete search history.

(56) References Cited

U.S. PATENT DOCUMENTS

| | | | | |
|---|---|---|---|---|
| 5,604,895 A | * | 2/1997 | Raimi | G01R 31/31835 703/13 |
| 8,392,441 B1 | * | 3/2013 | Papachristou | G06F 17/30646 707/759 |
| 9,043,761 B2 | * | 5/2015 | Artzi | G06F 11/3692 717/124 |
| 9,280,442 B1 | * | 3/2016 | Nicolo | G06F 11/3604 |
| 9,400,778 B2 | * | 7/2016 | Ramani | G06F 40/30 |

(Continued)

OTHER PUBLICATIONS

A. Bandyopadhyay, "Improving spectrum-based fault localization using proximity-based weighting of test cases," 2011 26th IEEE/ACM International Conference on Automated Software Engineering (ASE 2011), Lawrence, KS, 2011, pp. 660-664. (Year: 2011).*

(Continued)

*Primary Examiner* — Andrew M. Lyons
(74) *Attorney, Agent, or Firm* — Maschoff Brennan

(57) ABSTRACT

According to an aspect of an embodiment, a method may include executing multiple tests with respect to code under test of a software program to perform multiple test executions. The method may further include identifying one or more passing tests and one or more failing tests of the test executions. In addition, the method may include determining an aggregated score for each statement based on two or more of: the passing tests and the failing tests; a semantic similarity between one or more statement tokens included in the respective statement and one or more report tokens included in an error report; and an amount of time that has passed from when the respective statement received a change. Moreover, the method may include identifying a particular statement of the plurality of statements as a fault location in the code under test based on the aggregated scores of the plurality of statements.

20 Claims, 7 Drawing Sheets

(56) References Cited

U.S. PATENT DOCUMENTS

| | | | | |
|---|---|---|---|---|
| 9,811,439 B1* | 11/2017 | Barrett | ............... | G06F 11/3612 |
| 9,846,637 B2* | 12/2017 | Yoshida | .............. | G06F 11/3692 |
| 10,133,657 B2* | 11/2018 | Yoshida | .............. | G06F 11/3692 |
| 10,152,406 B2* | 12/2018 | Yoshida | .............. | G06F 11/3688 |
| 2004/0205717 A1* | 10/2004 | Chiang | ................. | G06F 11/362 |
| | | | | 717/124 |
| 2005/0028146 A1* | 2/2005 | Quick | ................ | G06F 11/3688 |
| | | | | 717/130 |
| 2007/0016894 A1* | 1/2007 | Sreedhar | ................... | G06F 8/43 |
| | | | | 717/131 |
| 2008/0196012 A1* | 8/2008 | Cohen | ..................... | G06F 8/75 |
| | | | | 717/125 |
| 2008/0282108 A1* | 11/2008 | Jojic | ...................... | G06F 8/436 |
| | | | | 714/26 |
| 2008/0313602 A1* | 12/2008 | Tillmann | ............ | G06F 11/3636 |
| | | | | 717/106 |
| 2009/0089745 A1* | 4/2009 | Johnson | ................... | G06F 8/71 |
| | | | | 717/107 |
| 2009/0138851 A1* | 5/2009 | Allen | ...................... | G06F 8/70 |
| | | | | 717/122 |
| 2009/0292941 A1* | 11/2009 | Ganai | ................. | G06F 11/3636 |
| | | | | 714/2 |
| 2009/0292954 A1* | 11/2009 | Jiang | .................. | G06F 11/0709 |
| | | | | 714/47.2 |
| 2010/0299654 A1* | 11/2010 | Vaswani | .............. | G06F 11/366 |
| | | | | 717/128 |
| 2011/0016356 A1* | 1/2011 | Artzi | .................. | G06F 11/3672 |
| | | | | 714/38.1 |
| 2011/0022551 A1* | 1/2011 | Dixon | ................ | G06F 11/3616 |
| | | | | 706/12 |
| 2011/0030061 A1* | 2/2011 | Artzi | ................... | G06F 11/3604 |
| | | | | 726/25 |
| 2011/0219360 A1* | 9/2011 | Srinivasa | ................ | G06F 17/30 |
| | | | | 717/124 |
| 2012/0054553 A1* | 3/2012 | Artzi | ................... | G06F 11/3688 |
| | | | | 714/38.1 |
| 2012/0167060 A1* | 6/2012 | Landwehr | ........... | G06F 11/3604 |
| | | | | 717/132 |
| 2012/0185731 A1* | 7/2012 | Barman | .............. | G06F 11/3604 |
| | | | | 714/38.1 |
| 2013/0024847 A1* | 1/2013 | Browne | .............. | G06F 11/3676 |
| | | | | 717/131 |
| 2013/0047140 A1* | 2/2013 | Shann | .................. | G06F 11/3664 |
| | | | | 717/128 |
| 2013/0047141 A1* | 2/2013 | Shann | .................. | G06F 11/3664 |
| | | | | 717/128 |
| 2013/0179863 A1* | 7/2013 | Vangala | ..................... | G06F 8/74 |
| | | | | 717/124 |
| 2014/0013307 A1* | 1/2014 | Hansson | ............. | G06F 11/3692 |
| | | | | 717/124 |
| 2014/0149435 A1* | 5/2014 | Sisman | ................. | G06F 11/362 |
| | | | | 707/751 |
| 2014/0365828 A1* | 12/2014 | Jiang | ................... | G06F 11/0706 |
| | | | | 714/37 |
| 2015/0033212 A1* | 1/2015 | Mizobuchi | .......... | G06F 11/3688 |
| | | | | 717/131 |
| 2015/0169431 A1* | 6/2015 | Ivankovic | ........... | G06F 11/3676 |
| | | | | 717/124 |
| 2015/0242380 A1* | 8/2015 | Guo | ..................... | G06F 17/2247 |
| | | | | 715/237 |
| 2015/0261661 A1* | 9/2015 | Shehory | .............. | G06F 11/3692 |
| | | | | 714/38.1 |
| 2015/0324195 A1* | 11/2015 | Henriksen | ......... | G06F 17/30106 |
| | | | | 717/102 |
| 2015/0347214 A1* | 12/2015 | Samuni | ................. | G06F 21/552 |
| | | | | 714/37 |
| 2016/0019133 A1* | 1/2016 | Forg cs | ............... | G06F 11/3612 |
| | | | | 717/128 |
| 2016/0246662 A1* | 8/2016 | Meng | .................... | G06F 11/079 |
| 2016/0299838 A1* | 10/2016 | Farchi | ................. | G06F 11/3688 |
| 2017/0004065 A1* | 1/2017 | Angwin | .............. | G06F 11/3668 |
| 2017/0052861 A1* | 2/2017 | Schuermyer | ............ | G06F 11/26 |
| 2017/0060733 A1* | 3/2017 | Abadi | ................. | G06F 11/3684 |
| 2017/0116114 A1* | 4/2017 | Tosar | .................. | G06F 11/3684 |
| 2017/0161182 A1* | 6/2017 | Yoshida | .............. | G06F 11/3692 |
| 2017/0212829 A1* | 7/2017 | Bales | .................. | G06F 11/3664 |
| 2018/0101468 A1* | 4/2018 | Tzabari | ..................... | G06F 8/75 |
| 2018/0276103 A1* | 9/2018 | Woulfe | ................. | G06F 11/362 |

OTHER PUBLICATIONS

D. Hao, L. Zhang, H. Mei and J. Sun, "Towards Interactive Fault Localization Using Test Information," 2006 13th Asia Pacific Software Engineering Conference (APSEC'06), Kanpur, 2006, pp. 277-284. (Year: 2006).*

W. E. Wong, V. Debroy, Y. Li and R. Gao, "Software Fault Localization Using DStar (D*)," 2012 IEEE Sixth International Conference on Software Security and Reliability, Gaithersburg, MD, 2012, pp. 21-30. (Year: 2012).*

W. E. Wong, R. Gao, Y. Li, R. Abreu and F. Wotawa, "A Survey on Software Fault Localization," in IEEE Transactions on Software Engineering, vol. 42, No. 8, pp. 707-740, Aug. 1, 2016. (Year: 2016).*

Abreu, R., Zoeteweij, P., & Van Gemund, A. J. (Sep. 2007). On the accuracy of spectrum-based fault localization. In Testing: Academic and Industrial Conference Practice and Research Techniques-Mutation, 2007. Taicpart-MUTATION 2007 (pp. 89-98). IEEE.

Xuan, J., & Monperrus, M. (Sep. 2014). Learning to combine multiple ranking metrics for fault localization. In Software Maintenance and Evolution (ICSME), 2014 IEEE International Conference on (pp. 191-200). IEEE.

Le, T. D. B., Oentaryo, R. J., & Lo, D. (Aug. 2015). Information retrieval and spectrum based bug localization: Better together. In Proceedings of the 2015 10th Joint Meeting on Foundations of Software Engineering (pp. 579-590). ACM.

Naish, L., Lee, H. J., & Ramamohanarao, K. (2011). A model for spectra-based software diagnosis. ACM Transactions on software engineering and methodology (TOSEM), 20(3), 11.

Apache Wicket 6.13.0 released, Apache Software Foundation, Jan. 5, 2014.

* cited by examiner

SOFTWARE PROGRAM FAULT LOCALIZATION

FIELD

The embodiments discussed in the present disclosure are related to software program fault localization.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include executing multiple tests with respect to code under test of a software program to perform multiple test executions. The method may further include identifying one or more passing tests of the test executions and identifying one or more failing tests of the test executions. In addition, the method may include determining an aggregated score for each statement based on two or more of: use and non-use of the respective statement in the passing tests and the failing tests; a semantic similarity between one or more statement tokens included in the respective statement and one or more report tokens included in an error report generated with respect to the code under test; and an amount of time that has passed from when the respective statement received a change. In addition, the method may include identifying a particular statement of the plurality of statements as a fault location in the code under test based on the aggregated scores of the plurality of statements.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
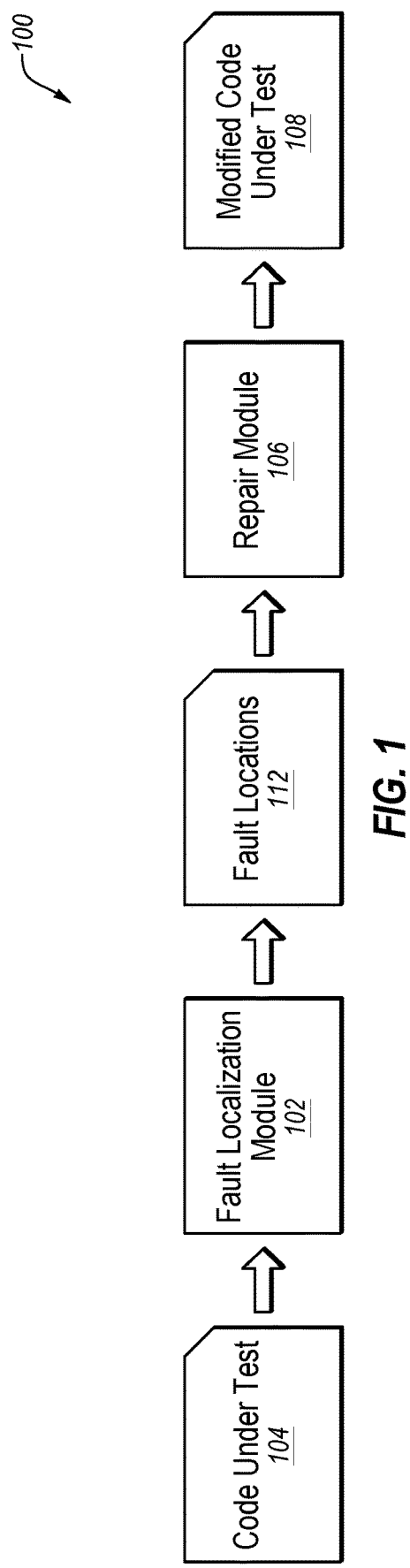
FIG. 1 is a diagram representing an example environment related to locating faults in a software program.

Some embodiments described in the present disclosure relate to methods and systems of identifying fault locations in a software program. In some embodiments, the fault localization may be used to repair the software program. Software programs often include faults (also commonly referred to as "bugs") that may cause the software programs to behave in an unintended manner. Additionally, automated repair systems and techniques are often used to detect, locate, and correct faults to repair software programs. In the present disclosure, reference to a "fault location" may refer to one or more lines of code (also referred to as "statements") that may cause the software program to operate in a manner different than as intended. Additionally, reference to "fault localization" or "locating a fault" may refer to identifying such statements and their respective locations in the software program.

According to one or more embodiments described in the present disclosure, one or more fault locations in a software program may be identified in a manner that may more accurately identify fault locations as opposed to other techniques used for fault localization. In particular, multiple tests may be executed with respect to code under test of the software program. Based on the results of the tests, a suspicion score may be determined for each statement of the code under test. As described further below, a suspicion score for a particular statement may be based on the particular statement's use or non-use in passing test executions and failing test executions of the software program. In addition, a semantic similarity score may be determined for one or more of the statements of the code under test. The semantic similarity score may be determined based on a semantic similarity between statement tokens included in the respective statement and one or more report tokens included in the error report. In the present disclosure, reference to a "statement token" may include any series of letters or words that may be used in a statement to designate an object (e.g., a variable, a method, a class, etc.) of the software program. Further, in the present disclosure, reference to a "report token" may include any series of letters or words that may be included in the error report. In these or other embodiments, a change score may also be determined for one or more statements of the code under test. The change score may be based on an amount of time that has passed from when the respective statement received a change. In these or other embodiments, an aggregated score may be determined for each statement based on its respective suspicion score, semantic similarity score and change score.

Additionally or alternatively, the aggregated scores may be used to identify a fault location. For example, in some embodiments, the statements may be prioritized as potential fault locations based on their respective aggregated scores. In the present disclosure, reference to prioritizing statements may include ranking statements such that a statement with a higher priority (e.g., a higher ranking) may be identified as a fault location prior to a statement with a lower priority (e.g., a lower ranking). Additionally or alternatively, prioritizing statements may include discarding or pruning statements that may have a little to no likelihood of being a fault location (e.g., as indicated by their respective aggregated scores).

For example, in some embodiments, the higher the aggregated score, the more likely it may be that a corresponding statement corresponds to a fault. In these or other embodiments, a particular statement with the highest aggregated score may be ranked accordingly and identified as a fault location. Note that in some instances, the particular statement may be identified as a fault location and further testing may prove that the particular statement may not in fact be a fault location. As such, reference to "identifying a statement as a fault location" may include making a determination with respect to such statement that may nor may not prove to be correct upon further inspection.

Embodiments of the present disclosure are explained with reference to the accompanying drawings.

FIG. 1 is a diagram representing an example environment 100 related to locating faults in a software program, arranged in accordance with at least one embodiment described in the present disclosure. Additionally or alternatively, in some embodiments, the environment 100 may be related to performing repair operations based on the located faults. The environment 100 may include a fault localization module 102 configured to analyze code under test 104 for faults and to identify fault locations 112 based on the fault analysis. In some embodiments, the environment 100 may include a repair module 106 configured to receive the located faults 112. In some embodiments, the repair module 106 may be configured to output modified code under test 108, which may include one or more modifications made to the code under test 104 by repair operations performed by the repair module 106 with respect to the fault locations 112.

The code under test 104 may include electronic data, such as, for example, the software program, code of the software program, libraries, applications, scripts, or other logic or instructions for execution by a processing device. In some embodiments, the code under test 104 may include multiple lines of code in which each line of code may be referred to as a statement in the present disclosure. In some embodiments, the code under test 104 may include a complete instance of the software program. Additionally or alternatively, the code under test 104 may include a portion of the software program. The code under test 104 may be written in any suitable type of computer language that may be used for the software program.

The fault localization module 102 may include code and routines configured to identify faults in the code under test and to output the fault locations 112. Additionally or alternatively, the fault localization module 102 may be implemented using hardware including a processor, a microprocessor (e.g., to perform or control performance of one or more operations), a field-programmable gate array (FPGA), or an application-specific integrated circuit (ASIC). In some other instances, the fault localization module 102 may be implemented using a combination of hardware and software. In the present disclosure, operations described as being performed by the fault localization module 102 may include operations that the fault localization module 102 may direct a corresponding system to perform.

The fault localization module 102 may be configured to perform a series of test operations with respect to the code under test 104 that may be used to identify one or more faults in the code under test 104. In some embodiments, the fault localization module 102 may be configured to perform one or more of the test operations based on one or more test suites.

For example, the fault localization module 102 may be configured to apply one or more test suites with respect to the code under test 104. In some embodiments, the fault localization module 102 may be configured to execute one or more tests included in the test suites, which may be referred to as performing a test execution. A test execution that passes may be referred to as a "passing test execution" and a test execution that fails may be referred to as a "failing test execution."

In some embodiments, the fault localization module 102 may be configured to generate a test spectrum based on passing and failing test executions. The test spectrum may include an indication as to which statements of the code under test 104 were involved in or executed during each of the passing test executions and the failing test executions. In some embodiments, the code under test 104 may be instrumented prior to performing the test executions. The instrumentation may add code to the code under test 104 such that statements that are executed during the test executions are tracked. As such, the test spectrum may be generated based on the instrumentation based on identification of which statements are involved with which passing test executions and failing test executions and corresponding designations therewith.

In some embodiments, the fault localization module 102 may be configured to determine a suspicion score for each of multiple statements included in the code under test 104. In some embodiments, the fault localization module 102 may be configured to determine a suspicion score for every statement included in the code under test 104. Additionally or alternatively, the multiple statements may be a subset of statements included in the code under test 104.

In these or other embodiments, the fault localization module 102 may be configured to determine the suspicion scores based on the test spectrum. For example, the fault localization module 102 may determine with which test executions a particular statement was executed or otherwise used. The relationship between how often the particular statement is used or executed in passing test executions as compared to failing test executions or not used at all in passing test executions or failing test executions may indicate how likely the particular statement includes a fault and thus is a fault location. As such, the suspicion score for the particular statement may be based on the particular statement's use or non-use in passing test executions and failing test executions in some embodiments such that the suspicion score may indicate the likelihood of the particular statement including a fault based on the relationship in its use with respect to passing and failing test executions. In some embodiments, the suspicion scores may be determined according to one or more operations described below with respect to a method 400 of FIG. 4.

In some embodiments, the fault localization module 102 may be configured to determine a semantic similarity score for each of one or more statements included in the code under test 104. In some embodiments, the fault localization module 102 may be configured to determine a semantic similarity score for every statement include in the code under test 104. Additionally or alternatively, in some embodiments, the fault localization module 102 may be configured to determine a semantic similarity score for each of a subset of statements included in the code under test 104.

In some embodiments, the subset of statements for which a semantic similarity score may be determined may be determined based on the suspicion scores of the statements. For example, in some embodiments, the fault localization module 102 may identify statements with a suspicion score that does not satisfy a threshold level ("suspicion threshold"). In these or other embodiments, the fault localization module 102 may be configured to not determine a semantic similarity score for statements with suspicion scores that do not satisfy the suspicion threshold. In some embodiments, the suspicion threshold may be determined based on an empirical analysis of a relationship between suspicion scores and actual fault locations. For example, in some instances, an empirical analysis may indicate that statements with suspicion scores of "0" may have little to no likelihood of including a fault such that the suspicion threshold may be set such that all statements with suspicion scores of "0" may be deemed as not satisfying the suspicion threshold and accordingly may not have semantic similarity scores determined therewith.

In some instances, the semantic similarity between tokens included in a particular statement and tokens included in an error report may indicate a likelihood that the particular statement includes a fault and is thus a fault location. For example, the more common tokens there are between the particular statement and the error report the more likely it may be that the particular statement includes a fault. In some embodiments, the semantic similarity scores may be based on a semantic similarity between statement tokens of the respective statements and report tokens of an error report that may be generated with respect to the code under test 104. Additionally or alternatively, the semantic similarity scores may be determined to indicate the likelihood of the respective statements including a fault based on the similarity between the respective statement tokens and the report tokens. In some embodiments, the fault localization module 102 may be configured to determine the semantic similarity scores according to one or more operations of a method 500 described below with respect to FIG. 5.

In some embodiments, the fault localization module 102 6 may be configured to determine a change score for each of one or more statements included in the code under test 104. In some embodiments, the fault localization module 102 may be configured to determine a change score for every statement include in the code under test 104. Additionally or alternatively, in some embodiments, the fault localization module 102 may be configured to determine a change score for each of a subset of statements included in the code under test 104.

In some embodiments, the subset of statements for which a change score may be determined may be determined based on the suspicion scores of the statements. For example, in some embodiments, the change score may be determined for statements that have suspicions scores that satisfy the suspicion threshold.

In some instances, the amount of time that has passed from when a particular statement received a change may indicate a likelihood that the particular statement includes a fault and is thus a fault location. For example, the more recently that the particular statement received a change, the more likely it may be that the particular statement includes a fault. In some embodiments, the change scores may be based on the amount of time that has passed from when the respective statements received a change. Additionally or alternatively, the change scores may be determined to indicate the likelihood of the respective statements including a fault based on the amount of time that has passed. In some embodiments, the fault localization module 102 may be configured to determine the change scores according to one or more operations of a method 600 described below with respect to FIG. 6.

In some embodiments, the fault localization module 102 may be configured to determine an aggregated score for each of the statements that have a suspicion score, a semantic similarity score, and/or a change score. The aggregated score of a particular statement may be based on the respective suspicion score, semantic similarity score, and/or change score of the particular statement. For example, in some embodiments, the aggregated score may be based on the respective suspicion score and the respective semantic similarity score. Additionally or alternatively, the aggregated score may be based on the respective suspicion score and the respective change score. In these or other embodiments, the aggregated score may be based on the respective change score and the respective semantic similarity score. Additionally or alternatively, the aggregated score may be based on the respective suspicion score, the respective semantic similarity score, and the respective change score. In some embodiments, the fault localization module 102 may be configured to determine the aggregated scores according to one or more operations of a method 700 described below with respect to FIG. 7.

In some embodiments, the fault localization module 102 may be configured to identify one or more fault locations in the code under test 104 based on the aggregated scores of the statements. For example, as indicated above, in some embodiments, the fault localization module 102 may be configured to prioritize the statements for identification as fault locations based on the aggregated scores of the statements. For example, in some embodiments, the fault localization module 102 may be configured to identify a particular statement as a fault location over other statements based on the prioritization according to the aggregated scores.

In some embodiments, the fault localization module 102 may be configured to output the identified fault locations as the fault locations 112. Additionally or alternatively, the fault localization module 102 may be configured to output as the fault locations 112 a list of all of the statements that have been prioritized according to one or more of the scores mentioned above.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform the repair operations based on a repair template.

In some embodiments, the repair module 106 may be configured to perform one or more of the repair operations with respect to one or more fault locations included in the fault locations 112. The repair operations may include any change to a particular statement that may repair a fault that may be included in the particular statement. In some embodiments, the changes may be made according to any applicable repair template. A change to a statement identified as a fault location may be referred to as a patch in the present disclosure. In some embodiments, the repair module 106 may be configured to output the modified code under test 108, which may include one or more patches that may be implemented with respect to one or more fault locations of the fault locations 112.

Modifications, additions, or omissions may be made to FIG. 1 without departing from the scope of the present disclosure. For example, the environment 100 may include more or fewer elements than those illustrated and described in the present disclosure. For example, in some embodiments, one or more routines, one or more instructions, or at least a portion of code of the fault localization module 102, the repair module 106, the test suites, and the repair template may be combined or separated. In some embodiments operations may be performed in a different order from what is described above.

Moreover, in some embodiments, the fault locations 112 may be used outside of the environment 100. In these or other embodiments, the environment 100 may include the fault localization module 102 but not the repair module 106.

Figure 2:
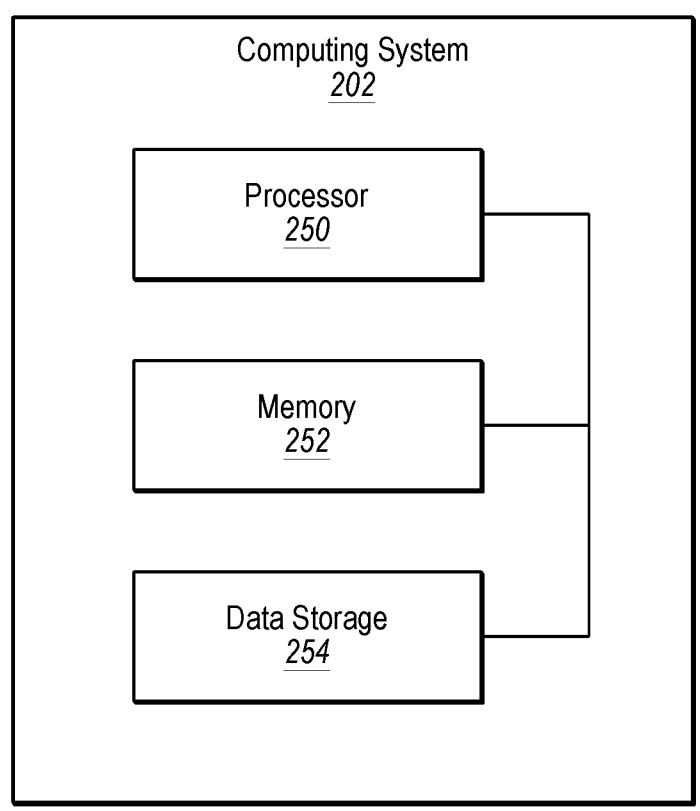
FIG. 2 illustrates an example computing system that may be configured to locate faults in a software program.

FIG. 2 illustrates a block diagram of an example computing system 202, according to at least one embodiment of the present disclosure. The computing system 202 may be configured to implement or direct one or more operations associated with a fault localization module and/or a repair module (e.g., the fault localization module 102 and/or the repair module 106 of FIG. 1). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the fault localization module and/or the repair module may be included in the data storage 254 as program instructions. The processor 250 may fetch the program instructions of the fault localization module and/or the repair module from the data storage 254 and may load the program instructions of the fault localization module and/or the repair module in the memory 252. After the program instructions of the fault localization module and/or the repair module are loaded into memory 252, the processor 250 may execute the program instructions such that the computing system may implement the operations associated with the fault localization module and/or the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
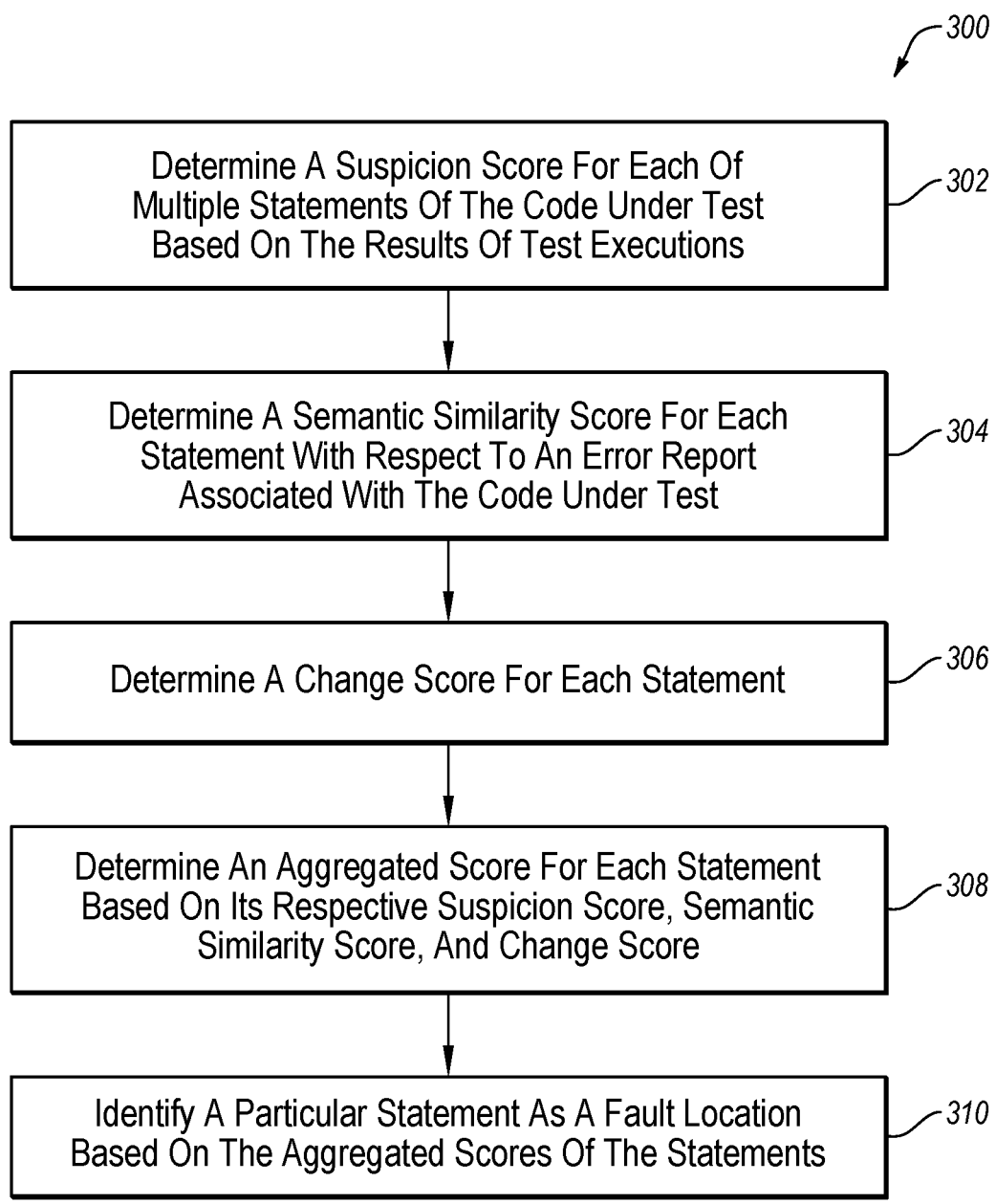
FIG. 3 depicts a flowchart of an example method of identifying a fault location in a software program.

FIG. 3 depicts a flowchart of an example method 300 of identifying a fault location in a software program, according to at least one embodiment described in the present disclosure. The method 300 may be performed by any suitable system, apparatus, or device with respect to code under test (e.g., the code under test 104 of FIG. 1) of the software program. For example, the fault localization module 102 or the repair module 106 of FIG. 1 or the computing system 202 of FIG. 2 (e.g., as directed by a fault localization module or a repair module) may perform or direct performance of one or more of the operations associated with the method 300 with respect to the software program. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which a suspicion score may be determined for multiple statements that may be included in the code under test of the software program that may be tested. In some embodiments, the suspicion score may be determined according to one or more operations described below with respect to the method 400 of FIG. 4.

At block 304, a semantic similarity score may be determined for each of the multiple statements for which the suspicion score may be determined at block 302. In some embodiments, a suspicion score may be determined at block 302 for each of one or more other statements than the multiple statements for which the semantic similarity score may be determined. Therefore, in some instances, the multiple statements referred to with respect to blocks 302 and

304 may be a subset of all the statements for which a suspicion score may be determined at block 302.

In some embodiments, the other statements may be excluded from having a semantic similarity score determined therewith in response to the other statements having suspicion scores that do not satisfy a suspicion threshold such as described above with respect to FIG. 1. Additionally or alternatively, the suspicion scores of the multiple statements may each satisfy the suspicion threshold such that a semantic similarity score may be determined for each of the multiple statements. In some embodiments, the semantic similarity score may be determined according to one or more operations described below with respect to the method 500 of FIG. 5.

At block 306, a change score may be determined for each of the multiple statements for which the suspicion score may be determined at block 302. Similar to as described above with respect to the semantic similarity scores, in some embodiments, a suspicion score may be determined at block 302 for each of one or more other statements than the multiple statements for which the change score may be determined. Therefore, in some instances, the multiple statements referred to with respect to blocks 302 and 306 may be a subset of all the statements for which a suspicion score may be determined at block 302.

In some embodiments, the other statements may be excluded from having a change score determined therewith in response to the other statements having suspicion scores that do not satisfy a suspicion threshold such as described above with respect to FIG. 1. Additionally or alternatively, the suspicion scores of the multiple statements may each satisfy the suspicion threshold such that a change score may be determined for each of the multiple statements.

At block 308, an aggregated score may be determined for each of the multiple statements. In some embodiments and as indicated above with respect to FIG. 1, the aggregated score of a particular statement may be based on the respective suspicion score, semantic similarity score, and/or change score of the particular statement. In some embodiments, the aggregated scores may be determined according to one or more operations of a method 700 described below with respect to FIG. 7.

At block 310, a particular statement may be identified from the multiple statements as a fault location. In some embodiments, the particular statement may be identified based on the aggregated scores of the multiple statements, such as described above with respect to FIG. 1.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 300 may include one or more operations that may prioritize the statements as being identified as fault locations based on the aggregated scores. For instance, the statements may be ranked based on their respective aggregated scores in which those statements with aggregated scores that indicate a higher likelihood of having faults are ranked higher and given a higher priority for identification than those statements with aggregated scores that indicate a lower likelihood of having faults. Moreover, in some embodiments, the method 300 may include performing one or more repair operations with respect to a statement identified as a fault location in response to the statement being identified as a fault location.

In addition, in some embodiments, the method 300 may be performed iteratively in which one or more operations may be performed with respect to a single fault location at a time. Additionally or alternatively, one or more operations associated with one or more blocks may be performed with respect to multiple fault locations at a time.

Figure 4:
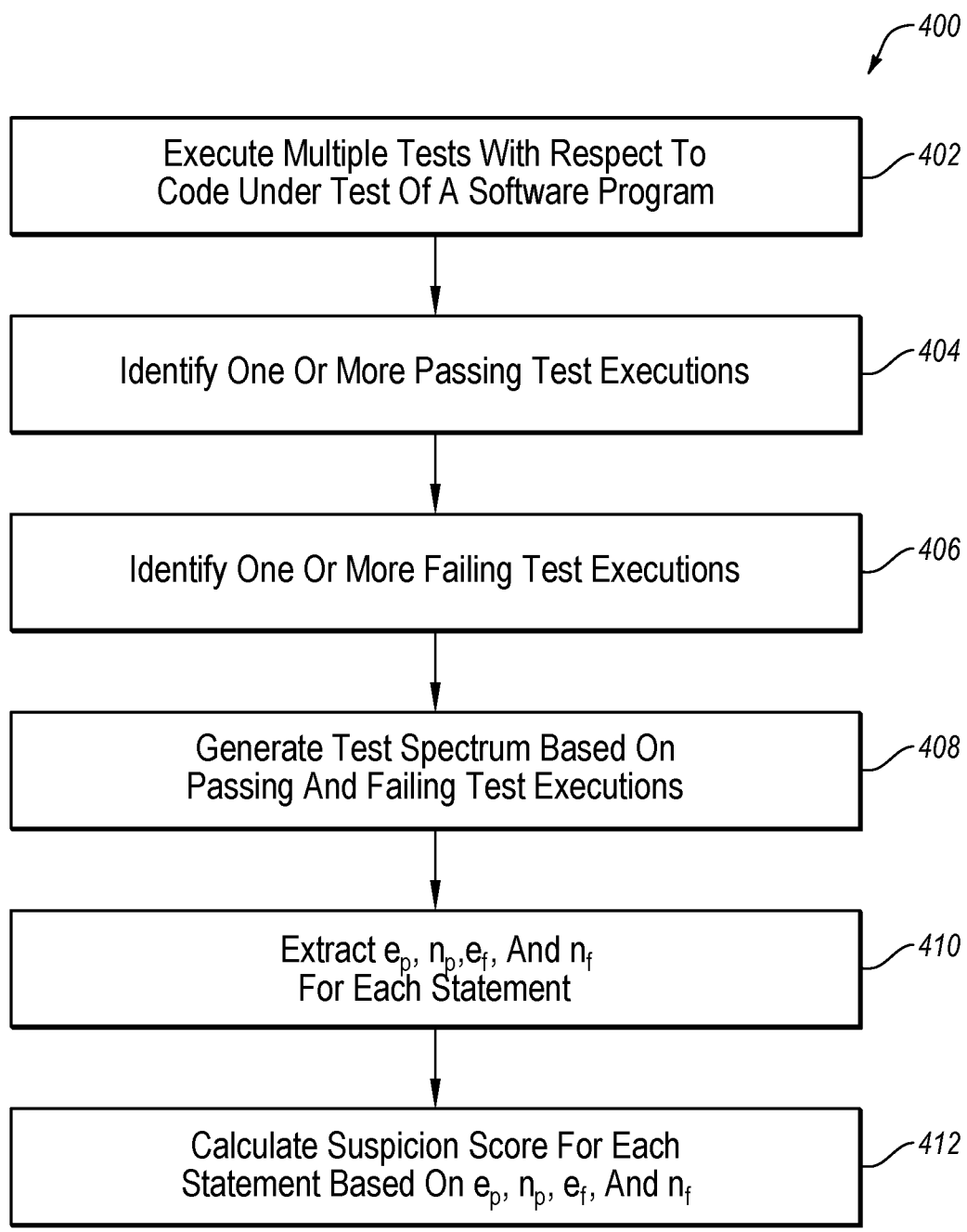
FIG. 4 depicts a flowchart of an example method of determining suspicion scores for statements of a software program that may be used to identify a fault location in a software program.

FIG. 4 depicts a flowchart of an example method 400 of determining suspicion scores for statements of a software program, according to at least one embodiment described in the present disclosure. As indicated above, the suspicion scores may indicate the likelihood that the statement includes a fault such that the suspicion scores may be used to identify a fault location in the software program. The method 400 may be performed by any suitable system, apparatus, or device with respect to code under test. For example, the fault localization module 102 of FIG. 1 or the computing system 202 of FIG. 2 (e.g., as directed by a fault localization module) may perform or direct performance of one or more of the operations associated with the method 400 with respect to code under test of the software program. Although illustrated with discrete blocks, the steps and operations associated with one or more of the blocks of the method 400 may be divided into additional blocks, combined into fewer blocks, or eliminated, depending on the particular implementation. As indicated above, in some instances, one or more of the operations of the method 400 may be performed with respect to block 304 and/or block 306 of the method 300.

The method 400 may begin at block 402, where multiple test executions may be performed with respect to the code under test. The test executions may include passing test executions and failing test executions in some embodiments. Additionally or alternatively, in some embodiments, the code under test may be instrumented prior to the performing the test executions such that statements that may be used or executed during the test executions may be identified.

At block 404, one or more passing test executions of the test executions may be identified. In these or other embodiments, all of the passing test executions may be identified. Additionally or alternatively, in some embodiments, one or more statements that were used or executed during the identified passing test executions may be identified based on the instrumentation. In these or other embodiments, all of the statements that were used or executed during the identified passing test executions may be identified.

At block 406, one or more failing test executions of the test executions may be identified. In these or other embodiments, all of the failing test executions may be identified. Additionally or alternatively, in some embodiments, one or more statements that were used or executed during the identified failing test executions may be identified based on the instrumentation. In these or other embodiments, all of the statements that were used or executed during the identified failing test executions may be identified.

At block 408, a test spectrum may be generated based on the passing test executions, the failing test executions and the statements. For example, in some embodiments, the test spectrum may indicate which statements were used or executed with respect to each of the passing test executions and each of the failing test executions. The test spectrum may also be generated to indicate which statements were not used or generated by each of the passing test executions.

Additionally or alternatively, the test spectrum may be generated to indicate which statements were not used or generated by each of the failing test executions.

At block 410, one or more use factors may be determined with respect to each of the statements that may be in the code under test. The use factors may be based on which passing test executions and failing test executions did or did not use or execute the respective statement. For example, in some embodiments, a use factor "$e_p$" that may indicate passing test executions that used or executed the respective statement may be determined for the respective statement. In these or other embodiments, a use factor "$n_p$" that may indicate passing test executions that did not use or execute the respective statement may be determined for the respective statement. In these or other embodiments, a use factor "$e_f$" that may indicate failing test executions that used or executed the respective statement may be determined for the respective statement. In these or other embodiments, a use factor "$n_f$" that may indicate failing test executions that did not use or execute the respective statement may be determined for the respective statement.

At block 412, a suspicion score may be determined for each statement. In some embodiments, the suspicion score may be determined based on the use factors determined for the respective statement. For example, in some embodiments, the suspicion score for each statement may be based on "$e_p$," "$n_p$," "$e_f$," and "$n_f$" of the respective statement. Some functions for calculating a suspicion score may include:

$$\text{Tarantula function} = \frac{\frac{e_f}{e_f + n_f}}{\frac{e_f}{e_f + n_f} + \frac{e_p}{e_p + n_p}}$$

$$\text{Ochiai function} = \frac{e_f}{\sqrt{(e_f + e_p)(e_f + n_f)}}$$

In some embodiments, the suspicion scores may be normalized. For example, in some instances, the suspicion scores may be normalized to have a value between "0" and "1" in which a score of "1" indicates a very high likelihood of the respective statement including a fault and in which a score of "0" indicates a very low or zero likelihood of the respective statement including a fault. Below is an example expression for determining a normalized suspicion score for a particular statement:

$$\text{Normalized Suspicion Score} = \frac{\text{Suspicion Score of the Statement}}{\text{Maximum Suspicion Score of Any Statement}}$$

In the above expression: "Suspicion Score of a Statement" may refer to the suspicion score determined for the particular statement; and "Maximum Suspicion Score of Any Statement" may refer to the highest suspicion score that may be determined with respect to all of the statements. Note that for a statement that has the highest suspicion score, the numerator and the denominator is the same. In some embodiments, the normalization may be performed after a suspicion score has been determined for every statement.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, one or more operations of the method 400 may be performed iteratively in which a single statement may be analyzed at a time. Additionally or alternatively, one or more operations associated with one or more blocks may be performed with respect to multiple statements at a time.

Figure 5:
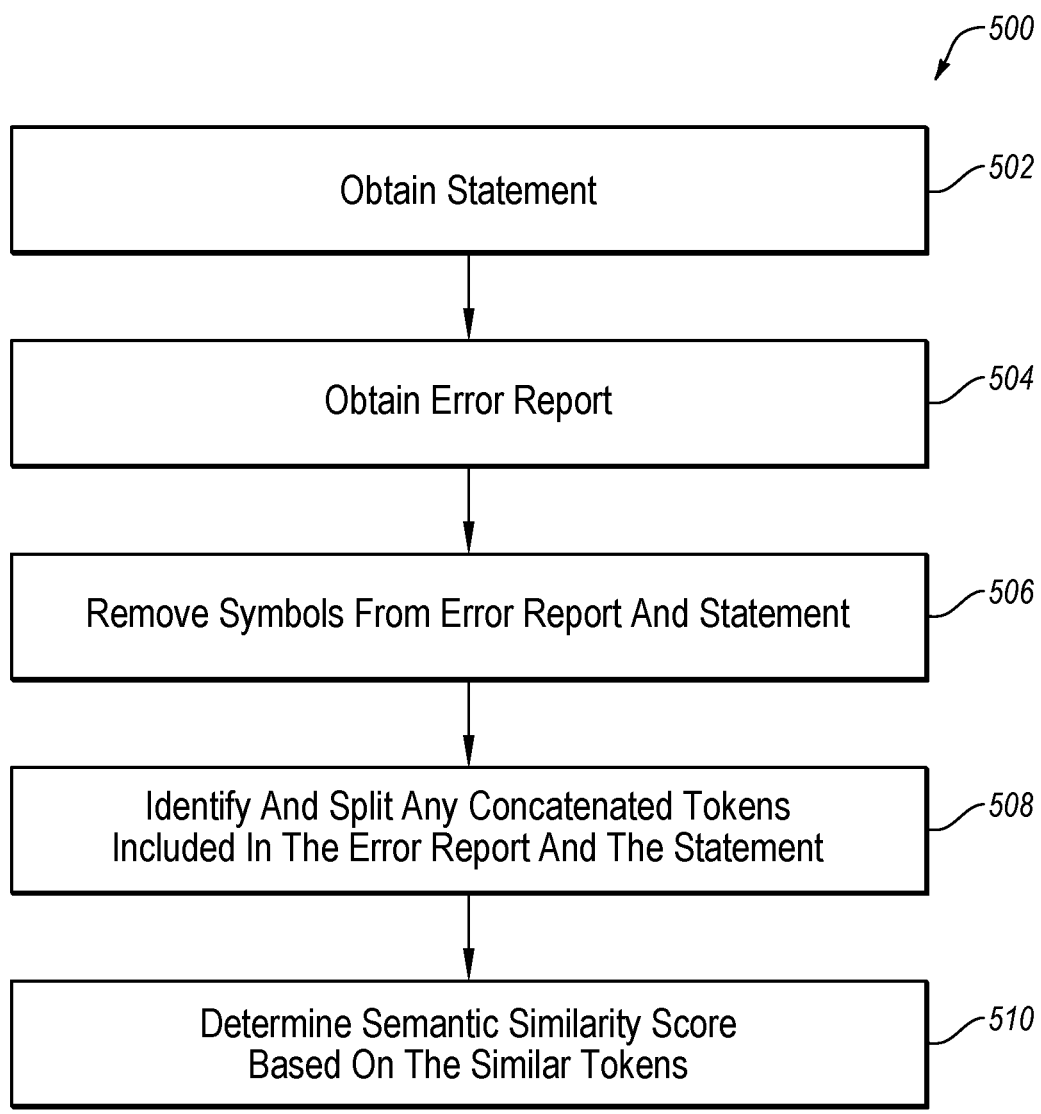
FIG. 5 depicts a flowchart of an example method of determining a semantic similarity score for a statement of a software program that may be used to identify a fault location in a software program.

FIG. 5 depicts a flowchart of an example method 500 of determining a semantic similarity score for a statement of a software program, according to at least one embodiment described in the present disclosure. As indicated above, the semantic similarity score may indicate the likelihood that the statement includes a fault such that the semantic similarity score may be used to identify a fault location in the software program The method 500 may be performed by any suitable system, apparatus, or device with respect to code under test (e.g., the code under test 104 of FIG. 1). For example, the fault localization module 102 of FIG. 1 or the computing system 202 of FIG. 2 (e.g., as directed by a fault localization module) may perform or direct performance of one or more of the operations associated with the method 500 with respect to a statement of code under test. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where the statement of the code under test may be obtained. In some embodiments, the statement may be obtained based on the statement having a suspicion score that satisfies a suspicion threshold such as described above with respect to FIGS. 1 and 3.

At block 504, an error report that relates to the code under test may be obtained. In some embodiments, the error report may be obtained from the corresponding error/fault tracking system related to testing the software program. In some instances, the error report may be a natural language description of the fault with an optional code snippet that may be written by developers, testers, or end-users.

At block 506, one or more symbols may be removed from the statement and from the error report. In some embodiments, all of the symbols may be removed from the statement and from the error report. In some instances, a symbol may be a mathematical operator such as +, −, etc., parentheses such as {,}, (,), etc.

At block 508, concatenated tokens included in the statement and included in the error report may be split. A concatenated token may include a token that includes one or more words or indicators that may also be used alone or that may be commonly used alone. For example, a token "getBehaviorId" may be a concatenated token because it may include the words "get" and "Behavior" and the indicator "Id" in which "get," "Behavior," and "Id" may be used alone in some instances. The splitting of the concatenated tokens may include splitting the concatenated tokens into the individual words or indicators that may be included in the concatenated tokens. For example, "getBehaviorId" may be split into "get," "Behavior," and "Id."

At block 510, a semantic similarity score may be determined for the statement. The semantic similarity score may indicate a semantic similarity of statement tokens of the statement with report tokens of the error report.

By way of example, in some embodiments, a textual similarity analysis may be performed with respect to one or more of the statement tokens with respect to one or more of the report tokens. In some embodiments, a textual similarity analysis may be performed between each statement token with respect to each report token. By way of example, in some embodiments the textual similarity may be determined by a Longest Common Subsequence (LCS) algorithm or a Jaccard Similarity Coeffiecient. Textual similarity may be also considered as the opposite of textual dissimilarity. Therefore, any applicable algorithms related to textual dissimilarity determinations such as edit distance may be used as well.

In some embodiments, the textual similarity analysis may be used to generate the semantic similarity score for the statement. For example, in some embodiments, a number of similar or common tokens (e.g., tokens with the same or similar textual descriptions) between the statement and the error report may be determined based on the textual similarity analysis. Additionally or alternatively, in some embodiments, the textual similarity score may be the number of determined common tokens.

In these or other embodiments, the semantic similarity score may be normalized to have a value between "0" and "1" in which a score of "1" indicates that the statement has the highest number of common tokens with respect to the error report as compared to other statements and in which a score of "0" indicates that the statement has no common tokens with respect to the error report. For example, in some embodiments, the semantic similarity score may be determined using the following expression:

$$\frac{\text{Number of common tokens for current statement}}{\text{Highest number of common tokens of any of the statements}}$$

In the above expression: "Number of common tokens for current statement" may refer to the number of common tokens determined for the statement for which the semantic similarity score may be determined; and "Highest number of common tokens of any of the statements" may refer to the highest number of common tokens that may be found with respect to all of the statements. Note that for a statement that has the highest number of common tokens, the numerator and the denominator is the same. In some embodiments, the normalization may be performed after the number of common tokens has been determined for every statement.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used. For example, advanced information retrieval techniques such as TF.DIF, Vector Space Model (VSM), BM25 etc. may also be used to determine the semantic similarity between each statement and error report. In addition, in some embodiments, the method 500 may be performed iteratively with respect to each statement individually or may be performed with respect to two or more statements at a time.

Figure 6:
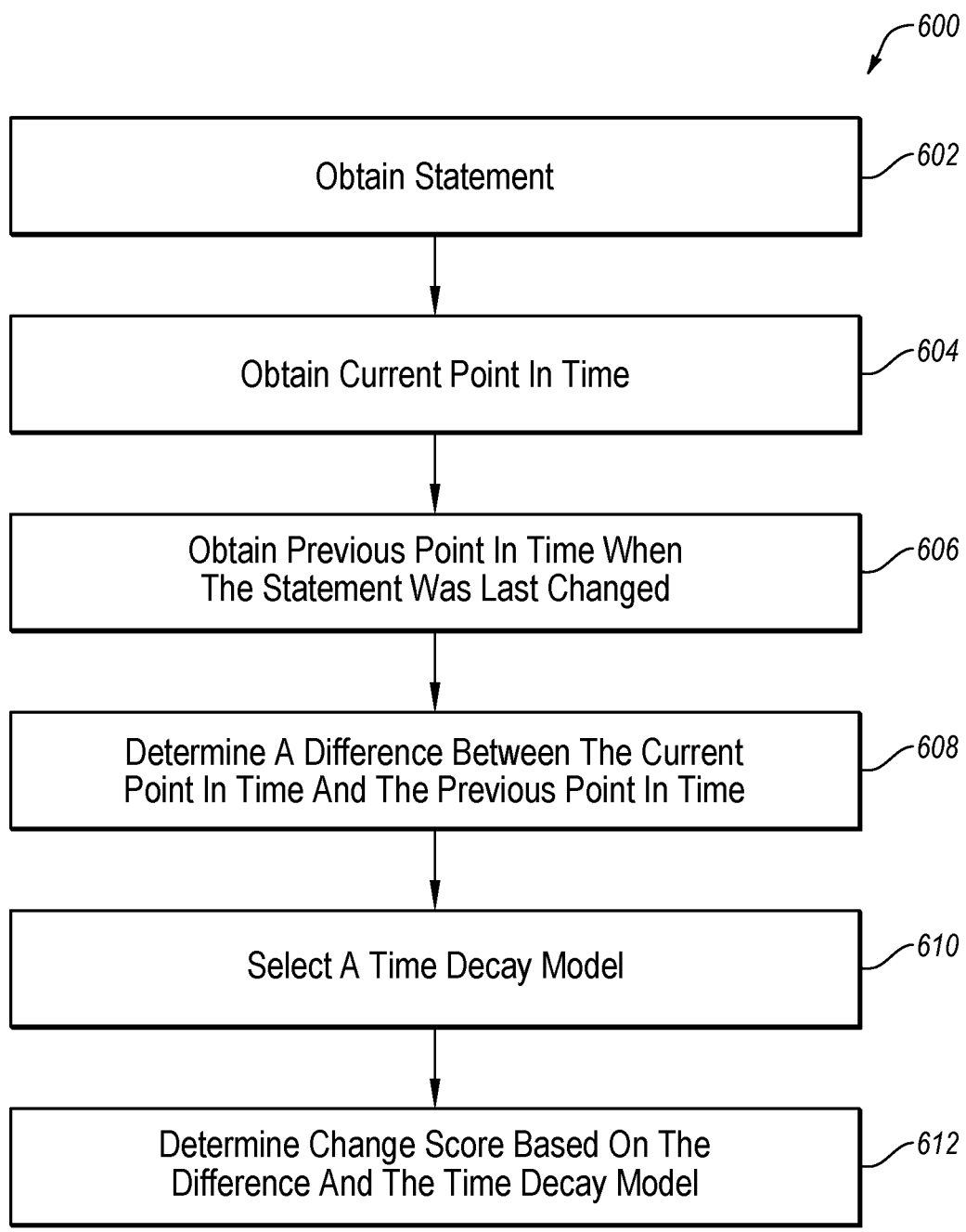
FIG. 6 depicts a flowchart of an example method of determining a change score for a statement that may be used to identify a fault location in a software program.

FIG. 6 depicts a flowchart of an example method 600 of determining a change score, according to at least one embodiment described in the present disclosure. As indicated above, the change score may indicate the likelihood that the statement includes a fault such that the change score may be used to identify a fault location in the software program The method 600 may be performed by any suitable system, apparatus, or device with respect to code under test (e.g., the code under test 104 of FIG. 1). For example, the fault localization module 102 of FIG. 1 or the computing system 202 of FIG. 2 (e.g., as directed by a fault localization module) may perform or direct performance of one or more of the operations associated with the method 600 with respect to a statement of code under test. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where the statement of the code under test may be obtained. In some embodiments, the statement may be obtained based on the statement having a suspicion score that satisfies a suspicion threshold such as described above with respect to FIGS. 1 and 3.

At block 604, a current point in time may be obtained. For example, the current point in time may be the current date and time.

At block 606, a previous point in time when the statement was last changed may be obtained. For example, a time and date as to when the statement was last changed may be obtained.

At block 608, a difference between the obtained current point in time and the obtained previous point in time may be determined. The difference may be determined in terms of seconds, minutes, hours, days, weeks, months, years, or any other way of measuring an amount of time that has passed. The difference accordingly may be used to determine how much time has passed from when the statement was last changed.

At block 610, a time decay model may be selected for determining the change score. In some embodiments, the time decay model may be a linear model in which different differences in time may affect the change score in a linear manner. For example, in a linear model a first change score that corresponds to a difference of two weeks may have a first value, a second change score that corresponds to a difference of four weeks may have a second value, and a third change score that corresponds to a difference of six weeks may have a third value. In this example, the relationship between the first value and the second value may be the same as or substantially the same as the relationship between the second value and the third value.

In some embodiments, the time decay model may be a nonlinear model in which different differences in time may affect the change score in a nonlinear manner. For example, in a nonlinear model a first change score that corresponds to a difference of two weeks may have a first value, a second change score that corresponds to a difference of four weeks may have a second value, and a third change score that corresponds to a difference of six weeks may have a third value. In this example, the relationship between the first value and the second value may not be the same as or substantially the same as the relationship between the second value and the third value.

As mentioned above, in some instances, the greater the amount of time that has passed from when a statement has been changed, the less likely it may be that the statement includes a fault. As such, in some embodiments, the nonlinear model may nonlinearly weight the differences in time more heavily with respect to differences that correspond to more recent changes than differences that correspond to less recent changes.

At block 612, a change score may be determined for the statement based on the time decay model and the difference in time determined at block 608. Additionally or alternatively, in some embodiments the change score may be determined such that it is normalized with a value between "0" and "1" in which a value closer to "1" indicates that a change has been made more recently than a value that is closer to "0."

For example, in some embodiments in which a linear time decay model is used, the change score may be determined for a statement based on the following expression:

$$\text{change score} = \frac{\text{diff} - \text{diff}_{min}}{\text{diff}_{max} - \text{diff}_{min}}$$

In the above expression: "diff" may refer to the time difference determined for the respective statement; "$\text{diff}_{min}$" may refer to the smallest time difference determined for any of the statements of the code under test; and "$\text{diff}_{max}$" may refer to the greatest time difference determined for any of the statements of the code under test. In some embodiments, the normalization may be performed after the time difference has been determined for every statement.

By way of another example, in some embodiments in which a nonlinear time decay model may be used, the change score may be determined for a statement based on the following expression:

$$\text{change score} = e^{-\beta t}$$

In the above expression: "$\beta$" may refer to a decay rate that may be based on the degree to which a longer passage of time may be weighted in determining the change score. Additionally, "t" may refer to the time difference determined for the statement.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used.

Figure 7:
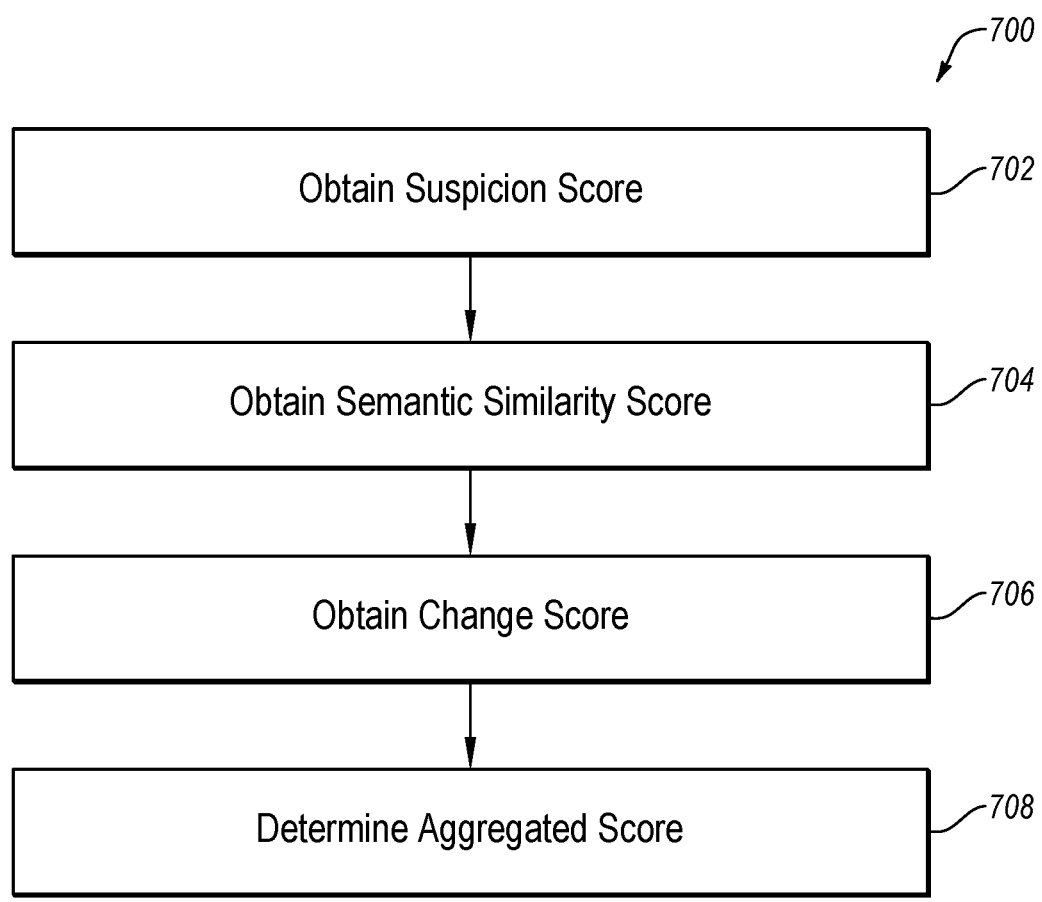
FIG. 7 depicts a flowchart of an example method of determining an aggregated score for a statement of a software program that may be used to identify a fault location in a software program.

FIG. 7 depicts a flowchart of an example method 700 of determining an aggregated score for a statement of a software program, according to at least one embodiment described in the present disclosure. As indicated above, the aggregated score may indicate the likelihood that the statement includes a fault such that the aggregated score may be used to identify a fault location in the software program. The method 700 may be performed by any suitable system, apparatus, or device with respect to code under test (e.g., the code under test 104 of FIG. 1). For example, the fault localization module 102 of FIG. 1 or the computing system 202 of FIG. 2 (e.g., as directed by a fault localization module) may perform or direct performance of one or more of the operations associated with the method 700 with respect to a statement of code under test. Although illustrated with discrete blocks, the steps and operations associated with one or more of the blocks of the method 700 may be divided into additional blocks, combined into fewer blocks, or eliminated, depending on the particular implementation.

The method 700 may begin at block 702, where a suspicion score may be determined for the statement. In some embodiments, the suspicion score may be determined according to one or more operations of the method 400 of FIG. 4. Additionally or alternatively, in some embodiments, the suspicion score may be normalized.

At block 704, a semantic similarity score may be determined for the statement. In some embodiments, the semantic similarity score may be determined according to one or more operations of the method 500 of FIG. 5. Additionally or alternatively, in some embodiments, the semantic similarity score may be normalized.

At block 706, a change score may be determined for the statement. In some embodiments, the change score may be determined according to one or more operations of the method 600 of FIG. 6. Additionally or alternatively, in some embodiments, the change score may be normalized.

At block 708, an aggregated score may be determined for the statement. In some embodiment, the aggregated score may be determined based on two or more of the suspicion score, the semantic similarity score, and the change score. For example in some embodiments, the aggregated score may be an average of the suspicion score and the semantic similarity score. Additionally or alternatively, the aggregated score may be an average of the suspicion score and the change score. In these or other embodiments, the aggregated score may be an average of the semantic similarity score and the change score. In these or other embodiments, the aggregated score may be average of the suspicion score, the semantic similarity score, and the change score. In some embodiments, the different scores used in generating the aggregated score may be weighted. Additionally or alternatively, the weighting may be determined based on a machine learning analysis of empirical data that may indicate which score may weigh more heavily in indicating that a statement may include a fault.

The calculation of the aggregated score may be different than an average. For example, the aggregated score may be determined as a sum, a product, or any other applicable operation. Additionally or alternatively, in some embodiments, two or more of the scores related to the aggregated score may be combined using a mathematical model learned using various machine learning techniques such as linear regression, logistic regression, decision tree techniques, or random forest techniques.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. Further, the scoring techniques given are merely examples and any suitable variation on scoring may be used.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   executing a plurality of tests with respect to code under test of a software program to perform a plurality of test executions;
   identifying one or more passing tests of the plurality of test executions;
   identifying one or more failing tests of the plurality of test executions;
   determining a suspicion score for each respective statement of a plurality of statements of the code under test of the software program based on:
      which of the one or more passing tests executed the respective statement;
      which of the one or more passing tests did not execute the respective statement;
      which of the one or more failing tests executed the respective statement; and
      which of the one or more failing tests did not execute the respective statement;
   performing a textual similarity analysis between one or more statement tokens included in the respective statement and one or more report tokens included in an error report generated with respect to the code under test;
   identifying, based on the textual similarity analysis, one or more common tokens that are shared between the respective statement and the error report;
   determining a semantic similarity score for each statement of the plurality of statements with respect to the error report based on the one or more common tokens;
   determining a change score for each statement of the plurality of statements, the change score being based on an amount of time that has passed from when the respective statement received a change;
   determining an aggregated score for each statement of the plurality of statements in which the aggregated score is a combination of the suspicion score, the semantic similarity score, and the change score for the respective statement;
   identifying a particular statement of the plurality of statements as a fault location in the code under test based on the aggregated scores of the plurality of statements; and
   performing repair operations with respect to the particular statement based on the particular statement being identified as the fault location, wherein the repair operations include making one or more modifications to the particular statement.

2. The method of claim 1, wherein the suspicion score for each statement of the plurality of statements satisfies a suspicion threshold indicating that each statement of the plurality of statements may have a fault associated therewith, and wherein the method further comprises:
   determining a suspicion score for each of one or more other statements included in the code under test that are not included in the plurality of statements, wherein the suspicion score for each of the one or more other statements does not satisfy the suspicion threshold; and
   determining the semantic similarity score and the change score for each statement of the plurality of statements but not for the one or more other statements based on the suspicion score of each statement of the plurality of statements satisfying the suspicion threshold and based on the suspicion score of each of the one or more other statements not satisfying the suspicion threshold.

3. The method of claim 1, further comprising:
   ranking the plurality of statements based on their respective aggregated scores; and
   identifying the particular statement as the fault location based on its ranking.

4. The method of claim 1, further comprising identifying the particular statement as the fault location based on its aggregated score as compared to other aggregated scores of other statements of the plurality of statements.

5. The method of claim 1, further comprising determining the change scores based on a time decay model that linearly weights the amount of time that has passed from when a change has occurred.

6. The method of claim 1, further comprising determining the change scores based on a time decay model that non-linearly weights the amount of time that has passed from when a change has occurred.

7. The method of claim 1, wherein determining the semantic similarity score includes:
   splitting each of one or more concatenated tokens included in the respective statement and the error report into a plurality of non-concatenated tokens; and
   determining the semantic similarity score based on the non-concatenated tokens.

8. The method of claim 1, further comprising weighing the suspicion scores, the semantic similarity scores, and the change scores in the aggregated scores determination based on a machine learning analysis of fault location selection based on previously determined aggregated scores.

9. The method of claim 1, wherein at least one non-transitory computer readable media is configured to store one or more instructions that, in response to being executed by at least one processor, cause a system to perform the method of claim 1.

10. The method of claim 1, wherein:
   determining the suspicion score includes
      determining a first use factor that indicates which of the one or more passing tests executed the respective statement;
      determining a second use factor that indicates which of the one or more passing tests did not execute the respective statement;
      determining a third use factor that indicates which of the one or more failing tests executed the respective statement;
      determining a fourth use factor that indicates which of the one or more failing tests did not execute the respective statement; and
      determining the suspicion score based on a relationship between the first use factor, the second use factor, the third use factor, and the fourth use factor.

11. A method comprising:
   executing a plurality of tests with respect to code under test of a software program to perform a plurality of test executions;
   identifying one or more passing tests of the plurality of test executions;
   identifying one or more failing tests of the plurality of test executions;
   for each respective statement of a plurality of statements of the code under test of the software program:
      determining a first use factor that indicates which of the one or more passing tests executed the respective statement;
      determining a second use factor that indicates which of the one or more passing tests did not execute the respective statement;
      determining a third use factor that indicates which of the one or more failing tests executed the respective statement;
      determining a fourth use factor that indicates which of the one or more failing tests did not execute the respective statement;
   determining an aggregated score for each respective statement based on:
      a relationship between the first use factor, the second use factor, the third use factor, and the fourth use factor;
      one or more common tokens shared between the respective statement and an error report generated with respect to the code under test in which the one or more common tokens are determined from a semantic similarity between one or more statement tokens included in the respective statement and one or more report tokens included in the error report; and
      an amount of time that has passed from when the respective statement received a change;
   identifying a particular statement of the plurality of statements as a fault location in the code under test based on the aggregated scores of the plurality of statements; and
   performing repair operations with respect to the particular statement based on the particular statement being identified as the fault location, wherein the repair operations include making one or more modifications to the particular statement.

12. The method of claim 11, further comprising:
   determining a suspicion score for each respective statement of the plurality of statements of the code under test of the software program based on the relationship between the first use factor, the second use factor, the third use factor, and the fourth use factor; and
   determining the aggregated scores based on the suspicion scores.

13. The method of claim 11, further comprising:
   determining a semantic similarity score for each statement of the plurality of statements, the semantic similarity score being based on the semantic similarity between the one or more statement tokens included in the respective statement and the one or more report tokens included in the error report; and
   determining the aggregated scores based on the semantic similarity scores.

14. The method of claim 11, further comprising:
   determining a change score for each statement of the plurality of statements, the change score being based on the amount of time that has passed from when the respective statement received a change; and
   determining the aggregated scores based on the change scores.

15. The method of claim 14, further comprising determining the change scores based on:
   a linear time decay model that linearly weights the amount of time that has passed from when a change has occurred; or
   a nonlinear time decay model that nonlinearly weights the amount of time that has passed from when a change has occurred.

16. The method of claim 11, further comprising identifying the particular statement as the fault location based on its aggregated score as compared to other aggregated scores of other statements of the plurality of statements.

17. The method of claim 11, wherein at least one non-transitory computer readable media is configured to store one or more instructions that, in response to being executed by at least one processor, cause a system to perform the method of claim 11.

18. A system comprising:
   one or more computer-readable storage media having instructions stored thereon; and
   one or more processors communicatively coupled to the one or more computer-readable storage media and configured to, in response to execution of the instructions, cause the system to perform operations comprising:
      executing a plurality of tests with respect to code under test of a software program to perform a plurality of test executions;
      identifying one or more passing tests of the plurality of test executions;
      identifying one or more failing tests of the plurality of test executions;
      determining an aggregated score for each respective statement of a plurality of statements of the code under test of the software program based on:
         which of the one or more passing tests executed the respective statement;
         which of the one or more passing tests did not execute the respective statement;
         which of the one or more failing tests executed the respective statement; and
         which of the one or more failing tests did not execute the respective statement;
         one or more common tokens shared between the respective statement and an error report generated with respect to the code under test in which the one or more common tokens are determined from a semantic similarity between one or more statement tokens included in the respective statement and one or more report tokens included in an error report generated with respect to the code under test;
      identifying a particular statement of the plurality of statements as a fault location in the code under test based on the aggregated scores of the plurality of statements; and
      performing repair operations with respect to the particular statement based on the particular statement being identified as the fault location, wherein the repair operations include making one or more modifications to the particular statement.

19. The system of claim 18, wherein the operations further comprise:
   determining a suspicion score for each statement of the plurality of statements of the code under test of the software program based on the use and non-use of the respective statement in the passing tests and the use and non-use of the respective statement in the failing tests;
   determining a semantic similarity score for each statement of the plurality of statements, the semantic similarity score being based on the semantic similarity between the one or more statement tokens included in the respective statement and the one or more report tokens included in the error report;
   determining a change score for each statement of the plurality of statements, the change score being based on the amount of time that has passed from when the respective statement received a change; and
   determining the aggregated score for each statement of the plurality of statements based on the suspicion score, the semantic similarity score, and the change score for the respective statement.

20. The system of claim 19, wherein:
   determining the suspicion score includes
      determining a first use factor that indicates which of the one or more passing tests executed the respective statement;
      determining a second use factor that indicates which of the one or more passing tests did not execute the respective statement;
      determining a third use factor that indicates which of the one or more failing tests executed the respective statement;
      determining a fourth use factor that indicates which of the one or more failing tests did not execute the respective statement; and
      determining the suspicion score based on a relationship between the first use factor, the second use factor, the third use factor, and the fourth use factor.

* * * * *